Figure 1:
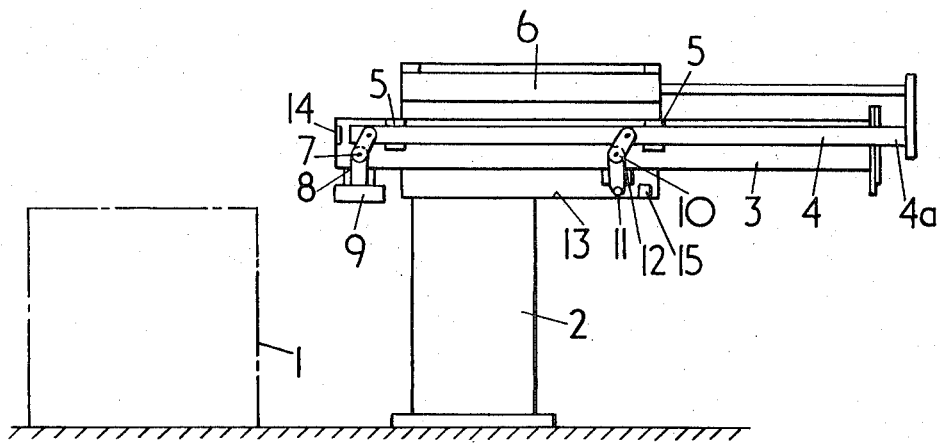

United States Patent [19]
Shaw et al.

[11] 3,830,022
[45] Aug. 20, 1974

[54] CLAMPING MECHANISM

[75] Inventors: James Thomas Shaw; Colin Graham Fawcett; Raymond Percy Arthur Lilley, all of Peterborough, England

[73] Assignee: Baker Perkins Limited, Peterborough, England

[22] Filed: Sept. 21, 1972

[21] Appl. No.: 290,799

[30] Foreign Application Priority Data
Oct. 6, 1971 Great Britain.................... 46540/71

[52] U.S. Cl....................... 51/217, 269/32, 269/228
[51] Int. Cl............................................ B24b 41/06
[58] Field of Search ......... 269/24, 27, 32, 134, 138, 269/201, 228; 51/217

[56] References Cited
UNITED STATES PATENTS
596,398 12/1897 Ellis ............................... 269/228 X
1,822,501 9/1931 Onsrud ............................ 269/32 X
3,302,943 2/1967 Mericle................................ 269/32
3,347,542 10/1967 Mericle.......................... 269/228 X Primary Examiner—Harold D. Whitehead
Attorney, Agent, or Firm—Larson, Taylor and Hinds

[57] ABSTRACT

A clamping mechanism particularly for applying downward clamping pressure on a workpiece on a snag grinding machine comprises a toggle mechanism terminating in a clamping member. The toggle mechanism is formed at the end of a rod carried in a horizontal arm which can extend and retract relative to a supporting housing. A piston and cylinder assembly is provided for extending and retracting the rod and arm relative to the housing and for moving the rod independently of the arm when the arm is extended to operate the toggle mechanism.

3 Claims, 3 Drawing Figures

CLAMPING MECHANISM

This invention relates to a clamping mechanism and it is an object of the invention to provide a clamping mechanism suitable for use in a snag or flash grinding machine of the type disclosed in our co-pending application of even data entitled "Grinding Machines", for clamping a workpiece to be machined to a fixture of the machine carried by a rotary table in such a manner that the clamping mechanism can be retracted to provide access above and around the workpiece.

The invention provides a clamping mechanism comprising a toggle linkage terminating in a clamping member, an operating rod for the linkage, the rod being carried by an arm for longitudinal movement with the arm between retracted and extended positions, the rod having an end portion for applying longitudinal pressure to the rod to move same with the arm between said positions and for longitudinally moving the rod independently of the arm in said extended position to operate the toggle linkage for the application and release of clamping pressure in a direction transverse to the direction of movement of the rod.

As applied to a snag or flash grinding machine of the type mentioned above, the mechanism is mounted on a reciprocatory table of the machine which table also carries the rotary workpiece-mounting table, and the rod and arm are adapted to move in a horizontal plane above the level of the top surface of the workpiece. In the extended position of the rod and arm, the toggle linkage is operated to clamp down onto the approximate vertical centre line of the workpiece. Rotation of the rotary member creates friction between the workpiece and the clamping member, which may be in the form of a resiliently backed cast iron plate for this purpose. Movements of the rod and arm may be effected by a double-acting piston and cylinder assembly, the piston rod of which is connected to the toggle operating rod.

Figure 2:
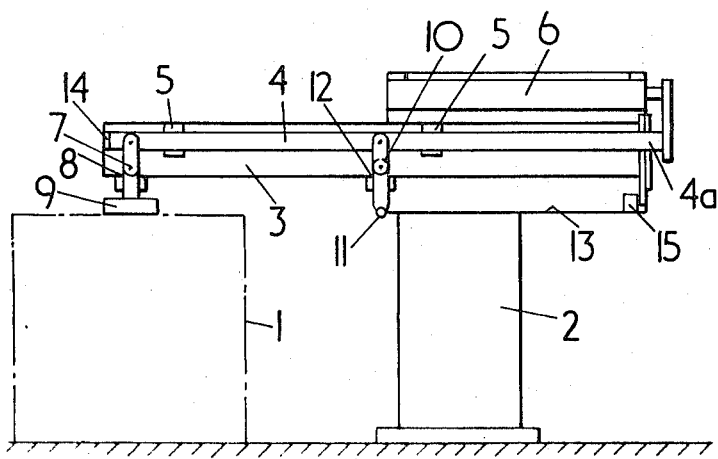
Figure 3:
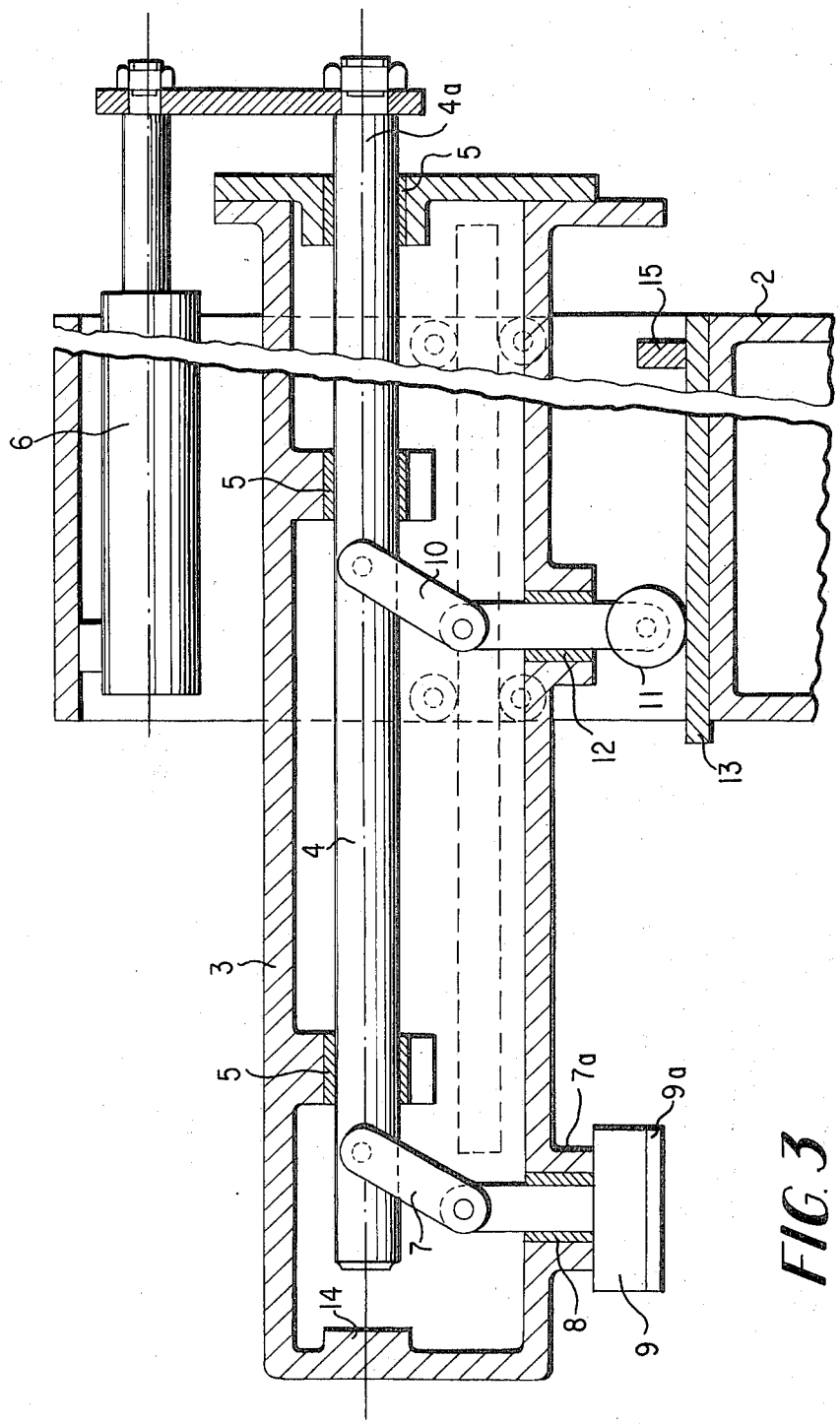

The invention will now be described by way of an example with reference to the accompanying drawings in which:

FIG. 1 is a side elevation of a clamping mechanism with the toggle operating rod and arm in a retracted position, FIG. 2 is a view similar to FIG. 1 with the rod and arm in an extended clamping position, and FIG. 3 is an enlarged fragmentary sectional view of the clamping mechanism in detail.

The purpose of the illustrated mechanism is to apply a downward clamping pressure on a workpiece 1 which may for example be a casting on a snag grinding machine of the type mentioned above.

A supporting housing 2, carries a clamp arm 3 mounted for horizontal movement in the housing, and a toggle operating rod 4 is carried in the arm 3 in bearings 5. One end 4a of the rod projects from the arm and is connected to the piston rod of a double acting hydraulic or pneumatic cylinder 6 attached to the housing. The rod 4 has a depending toggle linkage 7 at one end, projecting through an opening 8 in the arm 3 and terminating in a clamping member 9, such as a cast iron plate backed with resilient material 9a and a further linkage 10 is attached to the rod terminating in a roller 11 and projecting through an opening 12 in the arm 3. In the retracted position shown in FIG. 1, roller 11 rides on a cam track 13 on the housing.

When the piston rod is retracted from its position shown in FIG. 1 to apply pressure to the operating rod, engagement of the roller 11 on track 13 effectively locks the linkage 10 in position so that the arm 3 is caused to move to the left with the operating rod until in the extended position of the arm shown in FIG. 2, the roller 11 drops off the track 13 thereby freeing the linkage 10 and almost simultaneously arm 3 engages stop 15 and prevents further travel of the arm 3 and allowing the rod 4 to move independently of arm 3 to operate the toggle linkage 7 to apply clamping pressure to workpiece 1 until the rod encounters a stop 14 on the arm 3.

When the piston rod is extended from the FIG. 2 position, the toggle linkage 7 retracts the clamp 9 until it reaches its stop 7a, rod 4 together with roller 11 also retracts, thus, allowing the arm 3 to retract until piston rod is fully extended to the position shown in FIG. 1.

We claim:

1. A clamping mechanism comprising a toggle linkage terminating in a clamping member, an operating rod for the linkage rod being carried by an arm for longitudinal movement with the arm between retracted and extended positions, the rod having an end portion for the application of longitudinal pressure to move the rod with the arm between said positions and to move the rod independently of the arm in said extended position to operate the toggle linkage for the application and release of clamping pressure in a direction transverse to the direction of movement of the rod, said arm is carried for longitudinal movement in a housing including a cam track, and the rod carries a further linkage projecting through an opening in the arm and terminating in a follower member adapted to ride on said cam track to constrain the rod and arm to move in unison and to move off said cam track when the arm attains a predetermined position relative to the housing to allow movement of the rod independently of the arm for operation of the toggle linkage.

2. A clamping mechanism as claimed in claim 1 wherein said end portion of the rod projects from a rear end of the arm, and a piston rod of a piston and cylinder assembly is connected to said end portion of the rod such that retracting movements of the piston and cylinder assembly effect extending movements of the rod and arm relative to said housing and extending movements of the piston and cylinder assembly effect retracting movements of the rod and arm relative to said housing.

3. A clamping mechanism as claimed in claim 2 wherein the plate member has a resilient backing.

* * * * *